Aug. 18, 1970   C. E. HEMMINGER   3,524,820
MAKING SYNTHESIS GAS IN A TWO-STAGE FLUIDIZATION PROCESS
Filed Jan. 25, 1968
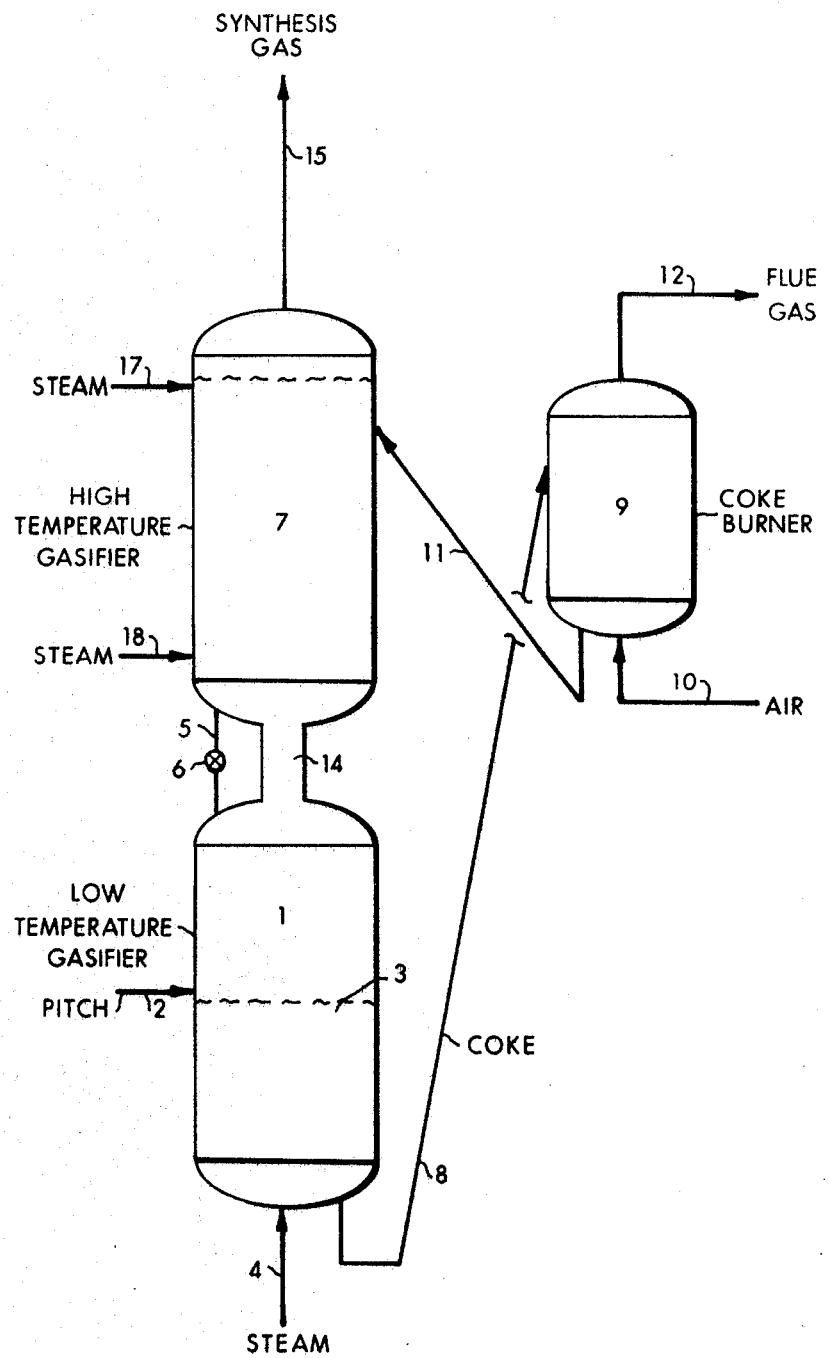
Charles E. Hemminger   Inventor
By

United States Patent Office 3,524,820
Patented Aug. 18, 1970

3,524,820
PREPARATION OF RARE EARTH METAL EXCHANGED CRYSTALLINE ALUMINO SILICATES
Kenneth D. Vesely, La Grange Park, Ill., assignor to Universal Oil Products Company, Des Plaines, Ill., a corporation of Delaware
Filed Aug. 19, 1968, Ser. No. 753,444
Int. Cl. C01b 33/28
U.S. Cl. 252—455        5 Claims

ABSTRACT OF THE DISCLOSURE

The ammonium form of a crystalline alumino silicate is ion-exchanged with a solution of rare earth metal salts. The alumino silicate and rear earth metal salt solution are commingled and passed through a series of contact zones in a simulated plug-flow whereby ion-exchange is effected with a substantially total utilization of the rare earth metal salts.

BACKGROUND OF THE INVENTION

For many years, heavy petroleum feed stocks boiling above about 400° F. have been converted to lower boiling more valuable fractions in the motor fuel boiling range by treatment at a temperature of from about 600° F. to about 1100° F. in contact with an amorphous siliceous cracking catalyst, commonly a composite of silica and alumina. More recently, improved catalysts have been prepared by the inclusion of a finely divided crystalline alumino silicate, or zeolite, within the amorphous siliceous matrix. Inorganic refractory oxides in general have been disclosed as suitable although not necessarily equivalent matrix materials.

The alumino silicate is suitably included in the inorganic oxide gel matrix by various methods wherein the alumino silicate is intimately admixed with the inorganic oxide while the latter is in a hydrous form, e.g., in the form of a hydrosol or hydrogel. Thus, the finely divided alumino silicate can be mixed directly with a siliceous hydrogel formed by hydrolyzing a basic solution of an alkali metal silicate with an acid such as hydrocloric, sulphuric, etc. Alternatively, the alumino silicate may be dispersed in a hydrosol obtained by reacting an alkali metal silicate with an acid or basic coagulant—the hydrosol being thereafter allowed to set to a hydrogel. In any case, the alumino silicate-inorganic oxide gel composition is washed, usually with an ammonium sulphate solution to remove alkali metal, and then water-washed to remove residual alkali metal sulphate.

In the course of the last mentioned washing procedure, substantially all of the alkali metal cations of the amorphous inorganic oxide portion of the composite are converted to water-soluble salts and washed from the composite as such. On the other hand, the alkali metal cations associated with the alumino silicate portion of the composite are ion-exchanged with ammonium ions which are retained by the alumino silicate. In the drying process said ammonium ions are decomposed to form the active hydrogen form of the alumino silicate.

Still more recently, it has been shown that a crystalline alumino silicate containing both rare earth metal cations and ammonium cations (subsequently converted to hydrogen cations) affords a further improved catalyst. Thus, the ammonium ion-exchanged crystalline alumino silicate before drying is advantageously treated at ion-exchange conditions in contact with a solution of rare earth metal salts to exchange a given portion of the ammonium cations with rare earth metal cations.

It is an object of this invention to precent a novel method of treating an ammonium ion-exchanged crystalline alumino silicate to exchange a given portion of the ammonium cations with rare earth metal cations.

SUMMARY OF THE INVENTION

In one of its broad aspects, the present invention relates to the treating of ammonium ion-exchanged crystalline alumino silicates to exchange a given portion of the ammonium cations with rare earth metal cations, and embodies the method which comprises (a) charging said ammonium ion-exchanged crystalline alumino silicate and a solution of rare earth metal salts to a contact chamber comprising a plurality of stirred contact zones, and (b) maintaining a simulated plug-flow of the resulting slurry through said contact chamber whereby back-mixing of the contents of one contact zone with the contents of the next preceding contact zone is substantially obviated, and (c) withdrawing the slurry from said contact chamber, separating the liquid phase therefrom, and recovering the rare earth-exchanged crystalline alumino silicate.

Other objects and embodiments of this invention will become apparent in the following detailed specification.

While the method of this invention is operable to effect rare earth metal cation exchange with the general class of crystalline alumino silicates, e.g., faujasite, mordenite, etc., in the ammonium form, it finds particular application in the treatment of ammonium-exchanged faujasites, particularly the Y type comprising silica and alumina in a mole ratio of at least 3 and which has found particular utility as a catalyst, or component thereof, in the catalytic cracking of petroleum feed stocks. The crystalline alumino silicate is suitably treated either alone or dispersed in a siliceous or other inorganic oxide matrix as is most often the case.

The rare earth metal salt solution may comprise a salt of one or more of the rare earth metals, said metals including cerium, lanthanum, prasedymium, neodymium, illinium, samarium, europim, gadolinim, terbium, dysprosium, holmium, erbium, thulim, scandim, yttrim, lutechium, etc. A wide variety of rare earth metal salts can be employed, the sole limitations being that the selected salt or salts is sufficiently soluble in aqueous media to promote rare earth metal cation exchange. The rare earth metal chlorides and nitrates are particularly suitable. It is the general practice to utilize the rare earth metal salt solutions which are commercially available. Said solutions generally comprise a mixture of chlorides, principally cerium, lanthanum, neodymium, and praseodymium chlorides, together with minor amounts of samarium, gadolinium and yttrium chlorides.

The further description of the method of this invention is presented with reference to one embodiment of the invention and to the attached schematic drawing, neither of which is intended as an undue limitation on the generally broad scope of the invention as set out in the appended claims. The schematic drawing shows a contact chamber 2 comprising a plurality of contact zones 3, 4, 5, 6 and 7 sequentially arranged and separated by a perforate plate section 19 whereby a simulated plug-flow is maintained through said contact chamber and any substantial back-mixing between one contact zone and the next preceding contact zone is substantially obviated. Each of said contact zones is provided with a mixing means 8.

A concentrated rare earth metal salt solution comprising 63.5 wt. percent rare earth metal chloride hexahydrate is contained in a storage tank 1. The principal rare earth metal components are cerium, (12.3 wt. percent, lanthanium (8.25 wt. percent) neodymium (3.38 wt. percent) and praseodymium (1.12 wt. percent). The rare earth metal salt solution is withdrawn from the storage tank through line 9 and charged by means of a pump 10 through line 11, diluted as hereinafter described with water from line 13, and continued through line 12 to the contact chamber 2. The concentrated rare earth metal salt solution is withdrawn from the storage tank 1 at a rate of about 0.19 gallon per minute and diluted with deionized water from line 13 charged at the rate of about 17.5 gallons per minute, the dilute rare earth metal salt solution then passing to the contact chamber by way of line 12 as aforesaid.

In this selected embodiment, the ammonium ion-exchanged crystalline aluminosilicate treated is a type Y faujasite dispersed in an amorphous silica matrix, the faujasite comprising about 10 wt. percent of the composite. The faujasite-amorphous silica composite, previously washed with ammonium sulphate solution and with water, and recovered as a filter cake comprising about 57 wt. percent water and 43 wt. percent solids, is continuously charged to the contact chamber 2 at the rate of about 136.5 lbs. per minute by way of line 14 concurrently with the rare earth metal salt solution charge thereto.

The resulting dilute slurry is thoroughly mixed in the first contact zone, as well as in each succeeding contact zone, by a mixing means 8 while moving downwardly through said contact chamber 2. The stirred slurry continues downwardly through said contact chamber passing through said perforate plate sections to effect a simulated plug-flow whereby back-mixing with the next preceding contact zone is substantially obviated. The elimination of any substantial amount of back-mixing minimizes the effect of displaced ammonium ions which would otherwise attain a concentration in the dilute slurry in equilibrium with the rare earth ions contained therein and effectively compete for available sites in the faujasite resulting in a substantial loss of rare earths. The dilute slurry is continuously withdrawn from the contact chamber through an outlet 15 and transferred by means of a pump 16 and by way of line 17 to a filter table not shown. The residence time of the reaction mixture in the contact chamber is about 55 minutes. The filtrate which is recovered is substantially free of rare earth metal salts while the faujasite-silica composite comprises about 10 wt. percent rare earth metal based on the weight of the faujasite, or 1.0 wt. percent based on the weight of the composite.

I claim as my invention:

1. A method of treating an ammonium ion-exchanged crystalline alumino silicate to effect rare earth metal cation exchange therewith, which comprises:
   (a) charging said alumino silicate and a solution of rare earth metal salts to a contact chamber comprising a plurality of stirred contact zones and
   (b) maintaining a simulated plug-flow of the resulting slurry through said contact chamber whereby back-mixing of the contents of one contact zone with the contents of the next preceding contact zone is substantially obviated, and
   (c) withdrawing the slurry from said contact chamber, separating the liquid phase therefrom, and recovering the rare earth-exchanged crystalline alumino silicate.

2. The method of claim 1 further characterized in that said ammonium ion-exchanged crystalline alumino silicate is a faujasite comprising silica and alumina in a mole ratio of at least about 3.

3. The method of claim 2 further characterized with respect to step (a) in that said solution comprises rare earth metal salts in a stoichiometric amount to exchange a desired amount of ammonium cations.

4. The method of claim 3 further characterized in that said faujasite is treated dispersed in an inorganic oxide gel matrix.

5. The method of claim 4 further characterized in that said matrix is a silica matrix.

References Cited

UNITED STATES PATENTS

| | | | |
|---|---|---|---|
| 3,140,251 | 7/1964 | Plank et al. | 252—455 X |
| 3,140,252 | 7/1964 | Frilette et al. | 252—455 X |
| 3,201,197 | 8/1965 | Showalter | 23—112 |
| 3,207,577 | 9/1965 | Mizuma | 23—125 |

EDWARD J. MEROS, Primary Examiner

U.S. Cl. X.R.

23—112